United States Patent [19]

Rake et al.

[11] Patent Number: 4,498,930
[45] Date of Patent: Feb. 12, 1985

[54] METHOD AND DEVICE FOR REGULATING THE BURNING PROCESS OF A CEMENT BURNING SYSTEM

[75] Inventors: Heinrich Rake, Aachen; Horst Herchenbach, Hennef; Gernot Jäger, Cologne; Gerhard Franck, Aachen, all of Fed. Rep. of Germany

[73] Assignee: Klöckner-Humboldt-Deutz AG, Fed. Rep. of Germany

[21] Appl. No.: 496,555

[22] Filed: May 20, 1983

[30] Foreign Application Priority Data

May 28, 1982 [DE] Fed. Rep. of Germany ....... 3220085

[51] Int. Cl.³ .............................................. C04B 7/44
[52] U.S. Cl. ................................................... 106/100
[58] Field of Search ........................................ 106/100

[56] References Cited

U.S. PATENT DOCUMENTS

| | | | |
|---|---|---|---|
| 3,627,287 | 12/1971 | Herz ..................................... | 106/100 |
| 3,647,195 | 3/1972 | Drewry ................................ | 106/100 |
| 4,026,717 | 5/1977 | Harris et al. ......................... | 106/100 |
| 4,236,932 | 12/1980 | Herchenbach et al. ............. | 106/100 |
| 4,300,879 | 11/1981 | Goldmann et al. .................. | 106/100 |

*Primary Examiner*—James Poer
*Attorney, Agent, or Firm*—Hill, Van Santen, Steadman & Simpson

[57] ABSTRACT

This invention relates to a method and device for regulating a cement burning system to make it more efficient. A product stream, in keeping with customary practice, passes successively through a pre-heating zone, a calcining zone, a sintering zone, and a cooling zone. In accordance with the present invention, the degree of deacidification of the product in the area of the calcining zone is determined by one of several methods and this determination is translated into control signals which control at least one parameter of the method in response to the degree of deacidification.

10 Claims, 2 Drawing Figures

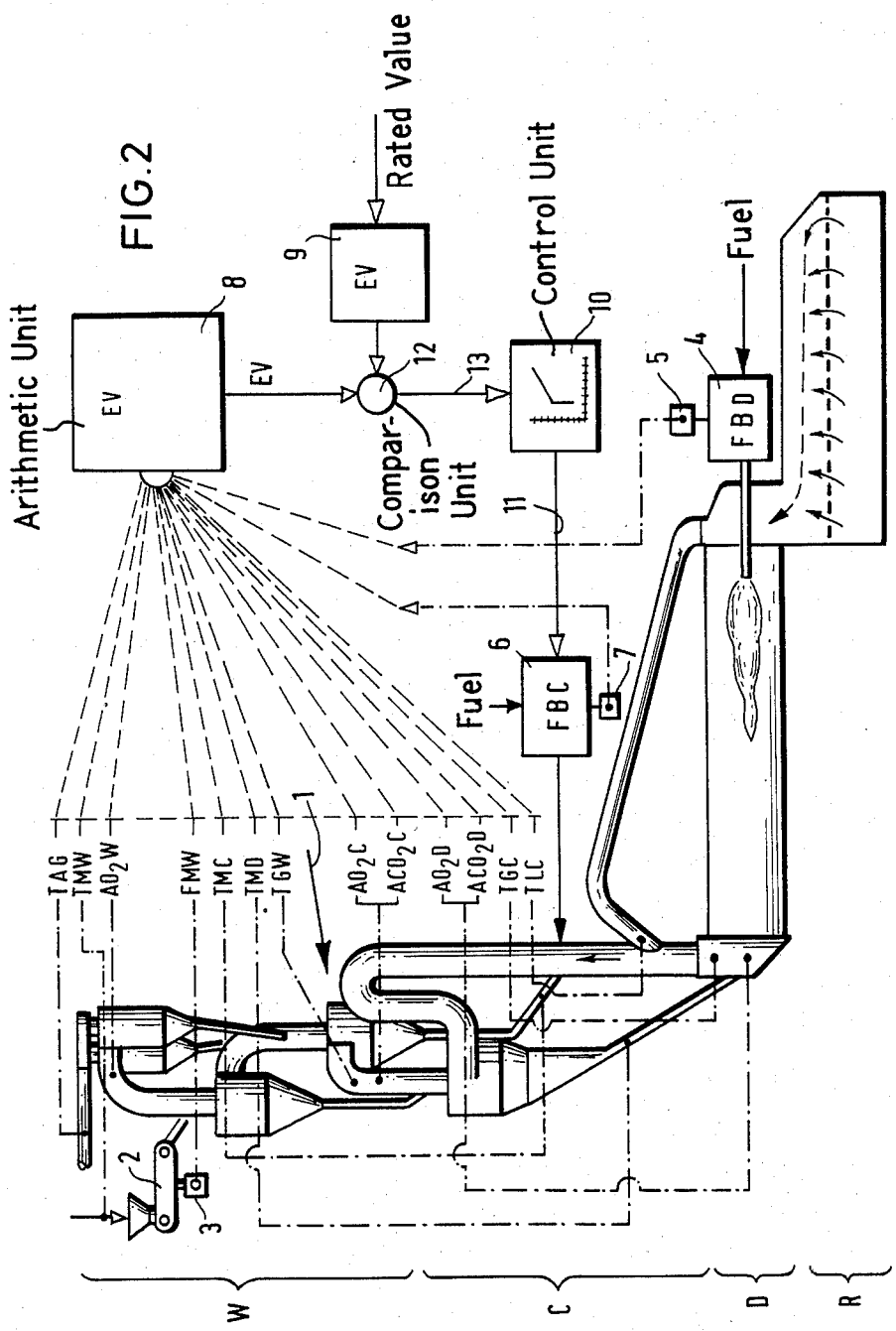

METHOD AND DEVICE FOR REGULATING THE BURNING PROCESS OF A CEMENT BURNING SYSTEM

BACKGROUND OF THE INVENTION

1. Field of the Invention

This invention is in the field of controlling a cement making method in which the raw material passes from a pre-heating zone to a calcining zone and then to a sintering zone and cooling zone. The specific improvements of the present invention center around measuring the degree of deacidification of the product and using this measurement as a basis for controlling efficient operation of this system.

2. Description of the Prior Art

In a modern cement burning system, the raw meal is pre-calcined to a specific degree, up to 90% in some instances, in a heat exchanger which includes a pre-heating zone and a calcining zone. In order to improve the efficiency and retain an uncomplicated process sequence, it is highly desirable to operate the heat exchanger such that the thermally treated material leaves with a constant, predetermined degree of deacidification so that it may be completely deacidified in the rotary tubular kiln and subsequently sintered. Such a process has the advantage that additional disruptions are kept away from the regulation of the rotary kiln.

Some of the difficulties which have to be overcome lie from the fact that the condition of the burning material cannot be measured directly in terms of deacidification or in terms of clinker formation without substantial investment. As a result, the prior art has gone to so-called substitute values. There are further difficulties presented from the fact that the individual zones of the burning system have only limited accessibility. Consequently, the measuring devices can only be installed at the boundaries of the zones.

In order to overcome these difficulties, it has been proposed to select the exhaust gas as the parameter which determines the output for the system and to regulate the specific amount of raw meal introduced in relationship to that value. It is also common to meter the amount of fuel required for the burning process in relationship to the ratio of amount of exhaust gas with the amount of raw meal. The temperature of the exhaust gas thereby serves as an indirect control means for the heat exchange. An amount of raw meal is also added so that this temperature remains constant. This type of system is described in DEX Zement-Kalk-Gips-No. 4/1972, pages 164 through 166).

A further difficulty to be overcome in the control of the burning process arises from the complexity of the thermal decomposition of calcium carbonate. According to GMELINS HANDBUCH DER ANORGANISCHEN CHEMIE, 8th Edition, 1956, the decomposition temperature can range from about 812° C. to 1120° C. with a $CO_2$ pressure of 760 Torr. These differences can be explained by the presence of a third, solid phase having variable additives whose occurrence depends essentially on the heating conditions (Chapter 28, Calcium-Oxide, pp. 31 ff.).

It is further known that calcination in the temperature range between 800° and 1100° C. proceeds at a constant velocity for each temperature. Calcination occurs in a very narrow zone, the phase boundary between CaO and $CaCO_3$. Various substances such as steam or carbon monoxide have an accelerating effect and under certain conditions, a catalytic effect. It is further known that the temperature coefficient of the reaction kinetics in the dissociation is equal to the temperature coefficient of the equilibrium pressure. The dissocation pressure thereby rises exponentially in relationship to the temperature. This is explained from the fact that events occurring in the dissociation are comparable to the evaporation of a fluid in that the development of a gaseous phase occurs due to a chemical separation process. For example, a dissociation pressure of 0.2 Torr at a temperature of 506° C. rises to 879 Torr at 904° C. and to 30,000 Torr at 1420° C.

The reaction kinetics of the calcium carbonate decomposition in the calcining process depends on the following, process-oriented parameters:

1. Dwell time of the material in the reaction system;
2. Material temperature;
3. Partial $CO_2$ pressure of the ambient gas stream;
4. Solids charge of the gas stream;
5. Mean grain size of the material;
6. Composition of the material;
7. Influence of accelerating or retarding additives.

It has been determined that the kinetic data of the specific calcium carbonate dissociation can be experimentally identified by keeping the most important parameters constant and varying one. (DEZ Zement-Kalk-Gips; No. 2/1979, pp. 78 through 82).

SUMMARY OF THE INVENTION

The present invention provides an uncomplicated means for regulation of the burning process of a cement burning system wherein the heat exchanger is operated with as few as possible number of controlled quantities to achieve stable equilibriums of the process sequencing.

This objective is achieved in that the degree of deacidification of the material in the area of the calcining zone is employed as the controlled quantity.

This objective could be achieved in that a small sample amount of the material leaving the pre-heater could be supplied to an X-ray analyzer for on-line analysis to identify the degree of deacidification based upon the residual content of carbonates or the content of calcium oxide. This system, however, would require a relatively large capital expenditure. In order to reduce this expenditure, the present invention provides a system in which the temperature of the material in the area of the calcining zone can be employed in order to identify the degree of deacidification.

In view of the complexity of the dissociation process, this invention further proposes that the course of the degree of deacidification for a material specimen which is representative in terms of grain size and composition be identified in the laboratory as a function of the material temperature with a constant influencing time.

In a similar manner, the method of the present invention proposes that the course of the degree of deacidification for a sample which is representative of the product in terms of grain size and material composition be measured as a function of the gas temperature of the sample and that the control of the degree of deacidification can be determined therefrom as a function of the measured gas temperature.

In order to be able to determine the degree of deacidification from the temperature of the pre-calcined meal or from the gas temperature of the reaction system which are linked to each other, the following equation is proposed:

$$EV = \frac{TMD - TE_u}{TE_o - TE_u}$$

EV represents the degree of deacidification.
TMD is the temperature of the powder at the outlet of the calciner.
$TE_u$ is the lowest temperature at which decarbonization of the sample begins.
$TE_o$ is the maximum temperature at which decarbonization is complete.

By selecting and fixing the upper and lower limits of the deacidification temperature interval for the material, the non-linear relationship between the effective degree of deacidification and the measurable temperature of the pre-calcined meal are to be made approximately detectable. The factor EV determined from the equation permits representative conclusions concerning the process cycle in the heat exchanger to be drawn. Deviations from a predetermined rated value prescribed for this factor can be directly employed for regulating the burning process and, in particular, for regulating the amount of fuel for the calcining zone.

Based on the theoretical bases of the dissociation process of calcium carbonate, it can be assumed that a decomposing lime particle has the same temperature as the gas surrounding it. With such a particle, the decomposition front advances toward the center of the particle with constant speed which is proportional to the difference between the equilibrium composition pressure corresponding to the gas pressure and the carbon dioxide partial pressure of the gas. The decomposition time is consequently directly proportional to the particle size. In addition to the temperature, the degree of deacidification essentially depends on the ratio of the mean particle size of the individual grains relative to the dwell time.

In order to take into account the numerous influencing variables in order to be able to set the best point for the burning process, we can proceed to make a more complete analysis of the deacidification reaction.

In particular, it is advantageous in accordance with the present invention to make a reaction balance taking into account the amount of streams of the product and gas as well as their temperatures and specific thermal contents. The mass velocity of the supplied fuel is calculated for the calcining zone with the appropriate elementary analysis, and a control means for the degree of deacidification is derived therefrom. It is advantageous that the operating parameters be kept essentially constant during such measurement. The calculation of the heat balance for the calcining zone is executed in such a manner that the amount of heat supplied to the sysstem of the calcining zone per mass unit of product and the amount of heat discharged from the system are compared to one another and the amount of heat consumed in the system, corresponding to the difference, is employed for determining the degree of deacidification.

In the preferred form of the present invention, the amount of fuel supplied to the calcining zone is employed as the controlled variable.

The apparatus for regulating the burning process of the present invention comprises a pre-heating zone, a calcining zone, a sintering zone, and a cooling zone in sequence as well as at least one measuring location for measuring temperature of the gas or product. The system of the present invention includes a control device which regulates the amount of fuel supplied to the calcining zone according to the sensing of the degree of deacidification of the product.

The apparatus of the present invention preferably exhibits the following combination of apparatus for acquiring the measuring values:

(a) a metering device for setting and detecting the mass streams of the fuels supplied to the burning system at various locations;

(b) a metering means for setting and detecting the mass stream of the product supplied to the calcining zone;

(c) an $O_2$ gas analyzer at a location between the sintering zone and the feed of the combustion air to the calcining zone, as well as at the discharge of the calcining zone and, if necessary, at the exhaust gas discharge;

(d) a $CO_2$ gas analyzer, particularly at the two aforementioned locations;

(e) temperature measuring means for:
  (1) the gas temperature between the sintering zone and the combustion air feed to the calcining zone;
  (2) the product temperature entering into the calcining zone;
  (3) the product temperature exiting from the calcining zone;
  (4) the gas temperature exiting from the calcining zone;
  (5) the gas temperature of the combustion air supplied to the calcining zone.

The device of the present invention includes a control means which may have the following units:

1. A unit for calculating the degree of deacidification which is coupled to the device used for acquiring the measured value;
2. A rated value input unit;
3. A rated value/actual value comparison unit;
4. A control unit for setting the manipulated variable for the fuel feed to the calcining zone according to the measurement of the identified degree of deacidification;
5. A controllable metering unit for feeding fuel into the calcining zone.

BRIEF DESCRIPTION OF THE DRAWINGS

A sample embodiment of the present invention is described in greater detail with reference to the accompanying sheets of drawings, in which:

FIG. 2 is a schematic illustration of a burning installation of the type employed in the present invention in addition to an identification of the measuring locations and a block diagram of the control means employed.

DESCRIPTION OF THE PREFERRED EMBODIMENTS

Figure 1:
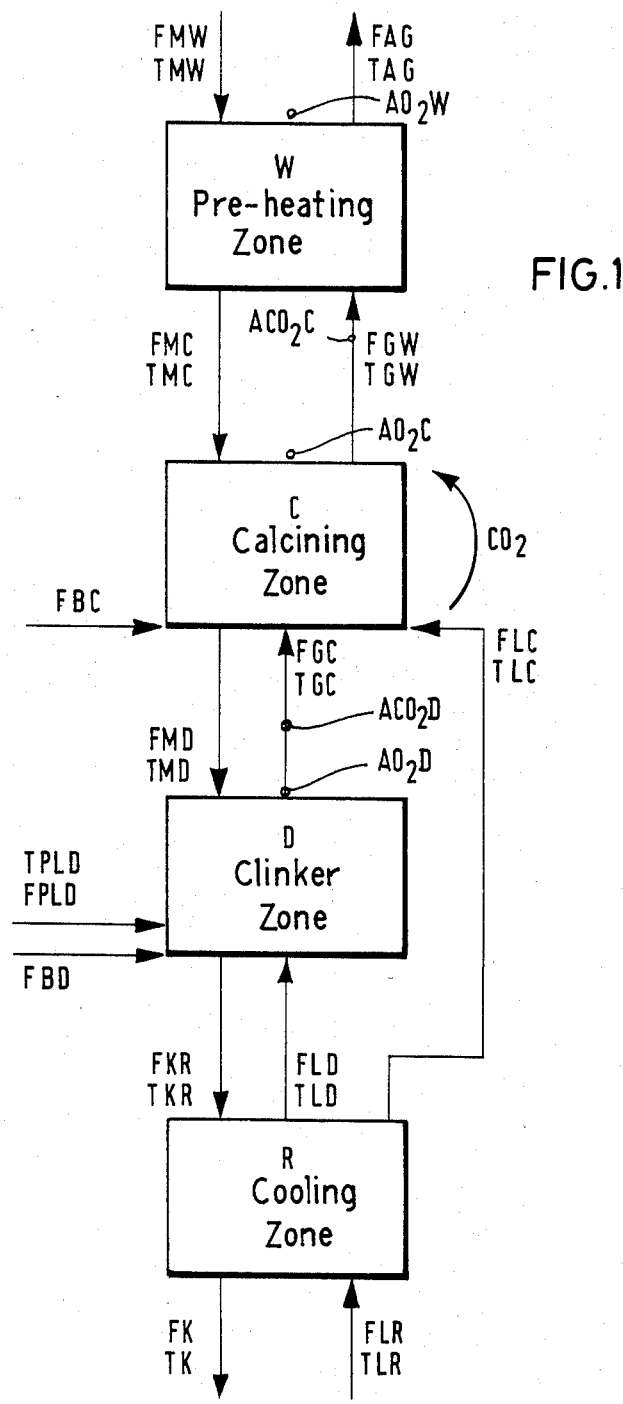
FIG. 1 is a greatly simplified flow chart of a cement installation of the type employing the improvements of the present invention.

The flow chart of FIG. 1 shows four mutually separated zones comprising the burning system. These are composed of a pre-heating zone "W", a calcining zone "C", a clinker zone "D" and a cooling zone "R". The mass streams of product and gas as well as of fuel are identified by suitable arrows. The letters employed in the drawing have the following significance:

| | | |
|---|---|---|
| F = mass stream | D = | clinker zone |
| M = product | PL = | primary air |
| W = pre-heating zone | B = | fuel |
| AG = exhaust gas | K = | clinker |
| C = calcining zone | R = | cooling zone |
| G = combustion gas | A = | gas analysis |
| L = air | | |

To illustrate, the arrow identified as FMW denotes the amount of the product stream entering the pre-heating zone and TMW identifies the temperature of the product. The arrow referenced FAG identifies the mass stream of the exhaust gas, and the exit temperature of the exhaust gas is referred to as TAG. Symbol $AO_2W$ identifies the analysis of the oxygen content of the exhaust gas leaving the pre-heating zone W. The carbon dioxide content of the gas passing from the calcining zone into the pre-heating zone is identified as $ACO_2C$. The oxygen content of the gas is referenced $AO_2C$. The fuel introduced into the calcining zone is referred to as FWC and the fuel introduced into the clinker zone is referred to as FBD.

A suitably designed heat balance of the system of the calcining zone of the present invention fulfills the equation:

$$EV = \Delta Q = Q_{supplied} - Q_{discharged}$$

$$EV = K \cdot (FMC \cdot TMC \cdot c_m + FBC \cdot H_u + FGC \cdot TGC \cdot c_m + FLC \cdot TLC \cdot c_m - FGW \cdot TGW \cdot c_m - FMD \cdot TMD \cdot c_m - Q_{remainder})$$

$c_m$ = specific heat content of the different gases;
$H_n$ = lower calorific value of the fuel.

$$FMD = K_1 \cdot FMC; \quad 0 < K < 1; \quad K = f(EV)$$

K = a factor of the weight change due to chemical conversions in product and gas.
$FGC = f(FBD; AO_2D + FCO_2D)$
$FGW = f(FBD; FBC; AO_2C + FCO_2D)$ In the schematic illustration of FIG. 2, there is illustrated a burning installation 1 having a pre-heating zone W, a calcining zone C, a clinker zone D and a cooling zone R. A metering unit 2 delivers raw meal into the pre-heating zone W and is equipped with a gravimetric metering means 3. This delivers an amount of the stream of the product "FMW". The fuel "FBD" intended for the clinker zone "D" is delivered with a metering unit 4 with which there is associated a weighing means 5. Likewise, the amount of the fuel stream "FBC" delivered to the calcining zone C is controlled in amount by a metering unit 6 and the input amount is indicated by the weighing means 7.

The temperature measuring location TAG indicates measurement of the exhaust gas temperature. The temperature measuring location TMC indicates measurement of the temperature of the product input into the calcining zone, while the temperature measuring location TMD indicates the temperature of the product flowing from the calcining zone into the clinker zone. Analysis values of the gas economy of the burning system 1 are indicated at the measuring locations $AO_2W$, $AO_2C$, $AO_2D$, as well as $ACO_2C$ and $ACO_2D$.

The control means of the system includes an arithmetic unit 8, a rated value input 9 and a control unit 10 which is functionally connected with the fuel metering unit 6 by means of a control line 11. The control means further comprises a comparison unit 12 which, in a known manner, compares the rated predetermined value appearing at the rated input value unit 9 to the value "EV" for the degree of deacidification calculated by the arithmetic unit 8. In the case of a deviation, it sends a control setting pulse to the control unit 10 on a control line 13.

The system functions as follows. The assumption is that there is an instantaneous equilibrium between the mass streams of product and gas and the heat streams prevailing in the four interconnected zones W, C, D, and R during operation of the burning system. The arithmetic unit 8 monitors the ratio of rated EV to actual EV. As long as there is no difference between the two values, the rated value for the degree of deacidification and the acutal value, the control means performs no operations on the mass and the heat equilibrium of the system 1. The arithmetic unit 8 identifies the actual value "EV" from the temperature TMD of the product passing from the calcining zone C into the clinker zone D. As long as no changes of the remaining operating parameters occur, the identification of the degree of deacidification "EV" from the temperature TMD suffices as a manipulated variable for the fuel feed FBC to the calcining zone C.

Based on the interrelationships explained above, one skilled in the art can experimentally identify correlation values for the progress of the degree of deacidification for a representative product in terms of grain size and material composition as a function of the product temperature and can derive therefrom the control of the degree of deacidification as a function of the temperature TMD. For checking the degree of deacidification "EV" identified in this manner, the gas temperature TGW can be measured and on the basis of a correlation factor previously identified experimentally, can be employed for additionally identifying the degree of deacidification and/or, under certain conditions, for a plausibility control of the degree of deacidification identified with the product temperature TMD.

A lower and an upper temperature value which approximately mark the limits of the reaction course are obtained at the discontinuity locations of the temperature curve in the experimental identification of the deacidifcation curve for a representative product sample. These lower and upper temperature values have been referred to as TEU and TEO, respectively. These values can be employed for further averaging out the degree of deacidification "EV" to be identified from the product temperature according to the equation previously given. Furthermore, an identification of the degree of deacidification "EV" can be obtained either by itself or additionally through the measurement of the $CO_2$ concentration in the gas economy. The degree of deacidification "EV" can, for example, be calculated from the following equation:

$$\frac{FCO_2C}{FCO_2 + FCO_2D}$$

A further check of the correlation coefficients is possible by means of a compilation of the heat balance provided with the present invention, particularly for the system of the calcining zone C. This heat balance comprises a calculation of the supplied and discharged thermal energy, and the degree of deacidification "EV" is calculated according to the equation:

$$EV = Q_{supplied} - Q_{discharged}.$$

The basic control principles used in the present invention are technically known. With too low a degree of deacidification EV, the fuel feed FBC is increased whereas the fuel feed is throttled when there is too high a degree of deacidification or too high a product temperature TMD.

It should be evident that various modifications can be made to the described embodiments without departing from the scope of the present invention.

We claim as our invention:

1. A method of regulating the roasting or burning process in a cement roasting or burning plant, in which a stream of material travels successively through a preheating zone, a calcining zone, a sintering zone and a cooling zone, wherein the regulation is carried out using the degree of deacidification of the material in a region of the calcining zone as a control condition.

2. A method as claimed in claim 1, wherein the temperature of the material in the region of the calcining zone is used to determine the degree of deacidification.

3. A method as claimed in claim 1, wherein the course of the degree of deacidification is determined experimentally for a sample of material, which is representative with regard to grain size and material composition, in dependence on the temperature of the material with a constant reaction time and wherein the degree of deacidification is determined from this, for the regulation, depending on the measured temperature of the material.

4. A method as claimed in claim 1, wherein the course of the degree of deacidification is determined experimentally for a sample of material which is representative with regard to grain size and material composition, depending on the gas temperature, with a constant reaction time, and the degree of deacidification is determined from this, for the regulation, depending on the measured gas temperature.

5. A method as claimed in claim 1, wherein the degree of deacidification EV is determined continuously for the regulation according to the equation $$EV = \frac{TMD - TE_u}{TE_o - TE_u}$$

in which TMD represents the temperature of the material on emerging from the calcining zone and $TE_o$ and $TE_u$ respectively represent an upper temperature limit and a lower temperature limit of the course of the degree of deacidification specific to the material.

6. A method as claimed in claim 1, wherein the temperature of the material and the temperature of the gas are measured in the region of the calcining zone and a characteristic value for the degree of deacidification is formed from the two temperatures.

7. A method as claimed in claim 1, wherein the $CO_2$ concentrations in the gas content are measured before and after the calcining zone and a quantity for the determination of the degree of deacidification is determined from the ratio of the two concentration values.

8. A method as claimed in claim 1, wherein a heat balance is calculated for the calcining zone and also for the preheating zone, from the mass flows of material and gas as well as their temperatures and specific heat contents and the mass flow of fuel supplied to the calcining zone with associated elementary analysis, and a quantity for the degree of deacidification is formed therefrom.

9. A method as claimed in claim 8, wherein in order to calculate the heat balance, the amount of heat supplied to the system of the calcining zone per unit of mass of the material and the amount of heat drawn off from the system are calculated and compared with one another, and the amount of heat used in the system, corresponding to the difference, is used to determine the degree of deacidification.

10. A method as claimed in claim 1, wherein the amount of fuel supplied to the calcining zone is used as the manipulated variable.

* * * * *